United States Patent [19]

Grauel et al.

[11] Patent Number: 4,603,919
[45] Date of Patent: Aug. 5, 1986

[54] DUAL CONTROL PRESSURE MEDIUM BRAKE SYSTEM

[75] Inventors: Ingolf Grauel, Vaihingen/Enz; Günter Kulke, Esslingen; Egbert Müller, Hochdorf; Werner Stumpe, Kornwestheim, both of Fed. Rep. of Germany

[73] Assignee: Robert Bosch GmbH, Stuttgart, Fed. Rep. of Germany

[21] Appl. No.: 415,614

[22] Filed: Sep. 3, 1982

[30] Foreign Application Priority Data

Nov. 12, 1981 [DE] Fed. Rep. of Germany ....... 3144961

[51] Int. Cl.$^4$ ............................................. B60T 15/18
[52] U.S. Cl. .................................... 303/6 R; 303/15; 303/28; 303/52; 303/6 A
[58] Field of Search ........................ 303/13, 15, 14, 16, 303/29, 17, 9, 78, 20, 40, 28, 50, 52, 6 A, 6 R, 7; 188/151 A; 251/14, 26, 29, 30, 130, 129; 137/625.4, 602

[56] References Cited

U.S. PATENT DOCUMENTS 2,922,678  1/1960  Schultz .............................. 303/40 X

FOREIGN PATENT DOCUMENTS 10827     9/1956  Fed. Rep. of Germany .
1085081   9/1967  United Kingdom .
1393776   5/1975  United Kingdom ..................... 303/7
2073835  10/1981  United Kingdom ................. 303/15

*Primary Examiner*—Douglas C. Butler
*Attorney, Agent, or Firm*—Edwin E. Greigg

[57] ABSTRACT

A pressure-medium brake system, which comprises multiple circuits and has associated with each brake cylinder or group of brake cylinders relay valves which are controllable by a control medium. Depending on the number of brake circuits and the kind of the respective control medium, the relay valves are provided with several, possibly different, control chambers. This results in an overlapping control which insures that each relay valve can even be controlled in the event that a control circuit has been lost. The brake system is preferably used in utility vehicles equipped with air brakes.

5 Claims, 3 Drawing Figures

4,603,919

DUAL CONTROL PRESSURE MEDIUM BRAKE SYSTEM

BACKGROUND OF THE INVENTION

The invention is based on a pressure-medium brake system. Such a brake system is known (German Patent Application No. W 10 827).

In such known brake systems a relay valve can only be controlled in a single circuit. In case of a defective control circuit this can lead to a loss of the brake.

OBJECT AND SUMMARY OF THE INVENTION

A pressure-medium brake system has, in contrast to the foregoing, the advantage that in the case of a loss of one control circuit another intact control circuit(s) can still control the relay valve. In this way the safety of the brake system is increased.

There is the additional advantage that a so-called "overlapping" control is used which achieves a further increase of the safety of the braking by means of the reciprocal control of the relay valves of several brake circuits.

The invention will be better understood and further objects and advantages thereof will become more apparent from the ensuing detailed description of preferred embodiments taken in conjunction with the drawings.

BRIEF DESCRIPTION OF THE DRAWINGS

Several exemplary embodiments of the present invention are shown in the drawings and are explained in more detail in the following description.

DESCRIPTION OF THE PREFERRED EMBODIMENTS

Figure 1:
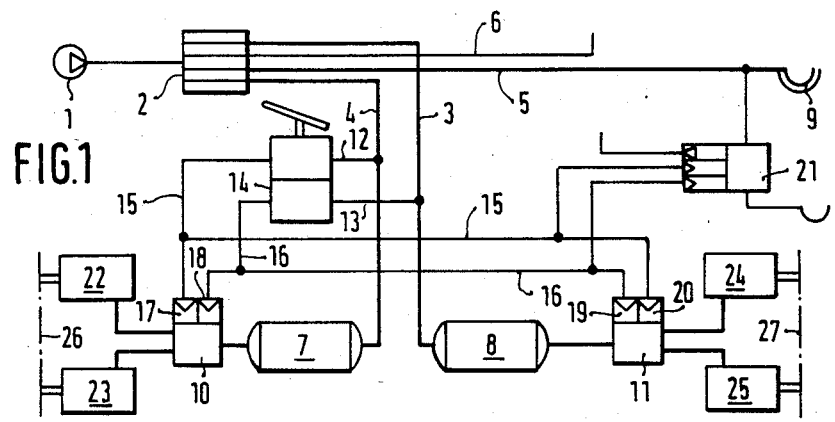
FIG. 1 shows a pressure-medium brake system with dual-circuit compressed air activation, FIG. 2 a pressure-medium brake system with compressed air in one circuit and hydraulic fluid in the other, and FIG. 3 a pressure-medium brake system with compressed air in one circuit and electric actuation of the other.

A dual-circuit air brake system is equipped with a compressor 1 and a quadruple-circuit safety valve 2 placed behind it in the circuit. Four supply lines 3, 4, 5, 6, start from the quadruple-circuit safety valve 2, two of which (3, 4) lead to tractor supply tanks 7, 8, one supply line (5) leads to a supply coupling head 9 of the trailer and one supply line (6) leads to an auxiliary consumer not shown. Both supply tanks 7 and 8 are designated as pressure-medium sources throughout the specification.

Dual control valves 10 and 11 are placed in the circuit behind each pressure-medium source 7 and 8 and control the flow of the pressure-medium from tractor supply tanks sources 7 or 8 to the brake cylinders. From each of the supply lines 3 and 4, branch line 12 and 13 lead to a multi-circuit brake valve 14, which can supply control media to two control lines 15 and 16. These control lines 15 and 16 are connected to pressure control elements 17, 18 and 19, 20 which controls the flow of supply fluid from supply tanks 7, 8 to the wheel cylinders through dual control the valve 10 as well as through dual control valve 11. Further, both control lines 15 and 16 also lead to a control valve 21 of the trailer, the control of which, however, is of no interest here.

A group of two brake cylinders 22 and 23 and 24 and 25 is placed in the circuit behind each relay valve 10 and 11, one for the front axle 26, the other for the rear axle 27.

The system set forth herein provides one brake circuit for the front wheels and a separate brake circuit for the back wheels. Each of the brake circuits are controlled by different relay valves 10 and 11 each of which are controlled by two control elements 17, 18 and 19, 20. Each of the control elements of each relay valve are connected to a different control circuit; therefore, if one control circuit is not functioning, the other control circuit will control the relay valves to pass fluid under pressure from the supply tanks 7, 8 to the wheel cylinders 22, 23 and 24, 25.

MODE OF OPERATION

When the multi-circuit brake valve 14 is activated, compressed air is admitted as control medium into the two control lines 15 and 16. All control pressure elements 17, 18, 19 and 20 of both relay valves 10 and 11 are supplied with control medium through these lines. The relay valves 10 and 11 are activated by the applied compressed air to open the valves 10 and 11 to thereby permit compressed air from the pressure-medium sources 7 and 8 to reach the brake cylinders 22, 23, 24 and 25 by a shortcut.

By means of the overlapping control of the two relay valves, i.e. by means of the additional control of one relay valve from the respective other circuit as well as because of the dual-circuitry of the entire system this control is fail-safe to a large degree, because during a loss of a control circuit both relay valves 10 and 11 are controlled and switched by the remaining intact circuit.

Figure 2:
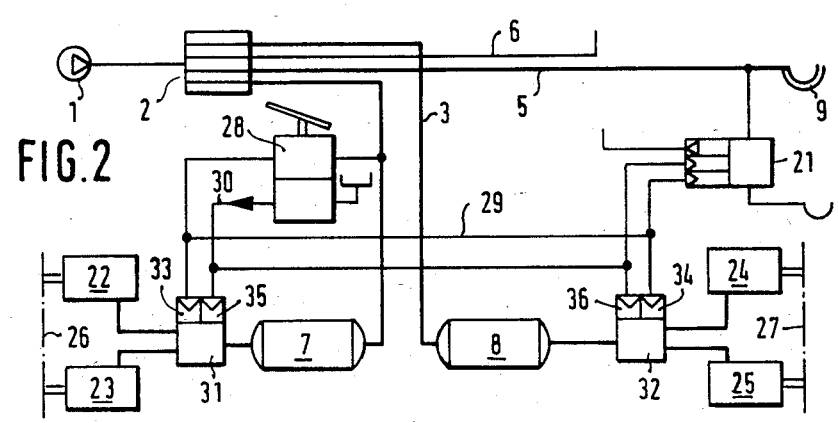

FIG. 2 shows a brake system similar to FIG. 1, only here the brake circuit is controlled by means of a hydraulic control medium. Equivalent parts therefore have the same reference numerals. A mixed multi-circuit pressure control valve 28 supplies a control line 29 with compressed air as pressure medium and another control line 30 with hydraulic fluid as pressure medium. Each relay valve 31 and 32 has a compressed air control element 33 and 34 and a hydraulic control element 35 and 36. The mode of operation of this system is largely analogous to that of FIG. 1, only that here the control is achieved by means of hydraulic fluid and/or compressed air as control medium.

Figure 3:
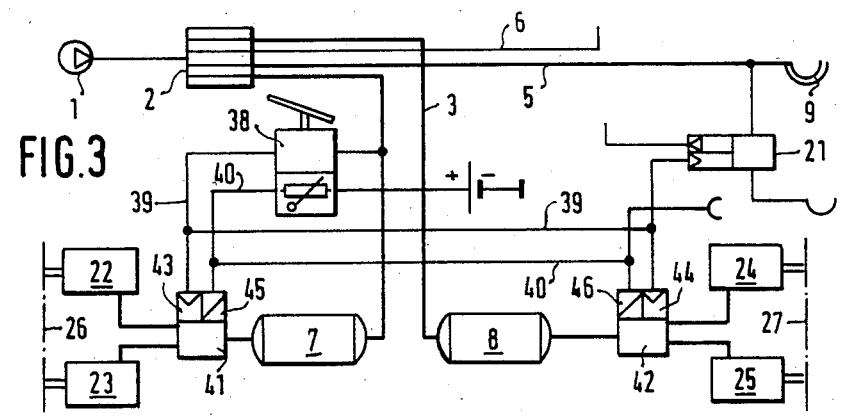

In FIG. 3 a brake system is shown, one brake circuit of which is controlled by means of compressed air and the other brake circuit by means of electric current. A mixed multi-circuit pressure control valve 38 supplies a control line 39 with compressed air as control medium and another control line 40 with an electric current as control medium. Each relay valve 41 and 42 has a compressed air control element 43 and 44 and electric control element 45 and 46 equipped with a electric valve. The mode of operation of this system, too, is largely analogous to that of FIGS. 1 and 2, only that here a compressed air and/or an electric control is used.

It is, of course, possible to utilize a hydraulic-electrical control. Furthermore, it is within the scope of the present invention to achieve the entire relay valve control with triple or quadruple circuits, also having the "overlapping" control according to the present invention. In triple or quadruple circuits the circuits 5 and/or 6 will be provided with pressure supply tanks and dual control valves such as in the two control lines shown and be controlled by the valve 14, 28 or 38.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A dual control pressure-medium brake system including at least two brake circuits, a pressure-medium source for each brake circuit, a dual control valve in each brake circuit which controls a pressure medium flow through a pressure medium control chamber for each brake circuit, each separate dual control valve comprising at least two control chambers, a control medium directed to each of said at least two control chambers to control said pressure medium in each brake circuit when the brakes are activated, each of said at least two control chambers of said dual control valves are controlled with control media from different brake circuits.

2. A dual control pressure-medium brake system in accordance with claim 1, characterized in that the control medium is compressed air, and a multi-circuit brake valve controls the compressed air from respective brake circuits into said control chambers of each of said dual control valve.

3. A dual control pressure-medium brake system in accordance with claim 1, in which hydraulic fluid is used as a control medium for one control chamber of each said dual control valve and compressed air is used for a control medium for another control chamber of each said dual control valve and that the two pressure media are controlled by way of a mixed multi-circuit pressure control valve from said brake circuits into said control chambers of each dual control valve.

4. A pressure-medium brake system in accordance with claim 1, in which compressed air is used as a control medium for one control chamber and an electric current is used as a control medium for another control chamber of each said dual control valve, whereby the pressure medium as well as the electric current is controlled by way of a mixed multi-circuit pressure control valve from said brake circuits into the different control chambers of each dual control valve.

5. A pressure-medium brake system in accordance with claim 1 in which said control chambers are controlled by means of hydraulic fluid and electricity.

* * * * *